United States Patent [19]

Buer

[11] Patent Number: 5,671,284
[45] Date of Patent: Sep. 23, 1997

[54] DATA ENCRYPTOR HAVING A SCALABLE CLOCK

[75] Inventor: Mark Leonard Buer, Chandler, Ariz.

[73] Assignee: VLSI Technology, Inc., San Jose, Calif.

[21] Appl. No.: 633,156

[22] Filed: Apr. 16, 1996

[51] Int. Cl.$^6$ ...................................... H04K 1/00
[52] U.S. Cl. ............................... 380/29; 380/38
[58] Field of Search ...................... 380/28, 29, 37, 380/38, 49

[56] References Cited

U.S. PATENT DOCUMENTS

| 5,128,959 | 7/1992 | Bruckert | 380/34 |
| 5,377,264 | 12/1994 | Lee et al. | 380/4 |

Primary Examiner—David C. Cain
Attorney, Agent, or Firm—Wagner, Murabito & Hao

[57] ABSTRACT

A method for encrypting and decrypting digital data. The digital data is initially latched by an input register. Sixteen separate cipher stages cascaded in series are used to encrypt the digital data. These cipher stages are operating at a maximum frequency limited only by the process technology. The encoded digital data from the last cipher stage is stored in an output register. The input and output registers are capable of being docked at an interface frequency that is different from that of the DES core's data frequency. After an appropriate number of cycles have elapsed, the output register is sampled. A programmable counter is used to indicate when the output register contains valid encrypted data.

18 Claims, 7 Drawing Sheets

DATA ENCRYPTOR HAVING A SCALABLE CLOCK

TECHNICAL FIELD

The present invention relates to the field of encryptors for encoding digital data. More specifically, the present invention pertains to a DES encryptor having a scalable clock.

BACKGROUND ART

Encryption is the act of transforming data into a form that is unrecognizable by an unauthorized party. Often, the encrypted data has the characteristics of a pseudo random number. Decryption is the act of returning this transformed data back into its original form. Generally, decryption is readily accomplished by an authorized user possessing knowledge of a secret, referred to as a "key." Thereby, successful data encryption maintains the privacy of the user by preventing unauthorized eavesdroppers from determining the content of the data. Without knowledge of the secret key, decryption is virtually impossible and breaking the code requires an extraordinary amount of time and computational resources. In current practice, secure private communication, especially over computer networks or digital phone lies, relies on encryption of the transmitted data. This is done to ensure the privacy and accuracy of the data being transmitted. For example, it is critical that financial exchanges (e.g., electronic money transfers from banks), military data, commercial transactions (e.g., airline reservations and ticket purchases), etc., be tamperproof and kept is strict confidence.

There exist many different strategies and methods for encrypting data. Generally, the more secure the encryption scheme, the longer it takes to perform the encryption/decryption. One encoding scheme that has gained widespread popularity and support is known as the Data Encryption Standard (DES). DES is a cryptographic encryption protocol adopted as a standard by the federal government and the American National Standards Institute. It has continued to serve as a federal standard up to the present date and is used extensively in business applications. Relevant documents describing DES include the National Bureau of Standards FIPS PUB 46 "Data Encryption Standard" (1977), FIPS PUB 81 "DES Modes of Operation" (1980), and FIPS PUB 74 "Guidelines for Implementing and Using the NBS Data Encryption Standard" (1981). Other relevant government documents include FIPS PUB 112 and 113, which specify DES use for password encryption and computer data authentication, respectively. The DES standard is unclassified and hence less formal explanations of the standard can also be found in standard public texts such as the book "Applied Cryptography" by Bruce Schneier. Currently, responsibility for reviewing DES and authenticating DES implementations lies with the National Institute of Standards and Technology (NIST) and the National Security Agency (NSA).

DES encrypts blocks of 64 bit plain text input into blocks of 64 bit cipher text by using a 56 bit key. The same key is used in both the encryption and decryption stage. The previously mentioned FIPS PUB 81, specified four modes of operation for DES: Electronic Codebook (ECB), Cipher Block Chaining (CBC), Output Feedback (OFB), and Cipher Feedback (CFB). The primary difference between these four modes is the effect one block can have on the encryption of subsequent blocks. In ECB mode, each 64 bit is encoded independently. In the other modes, previous blocks may also play a role in the encryption and hence, determine the cipher text for a given block. As a result, the ECB mode is more vulnerable to attack from an adversary, whereas the other modes are more secure.

However, the ECB mode is capable of delivering high encryption/decryption rates. ECB can be implemented to run in parallel on a multi-processor machine or on multiple machines. This is accomplished by splitting the initial data into separate parts. Each individual part may then be processed simultaneously amongst the multiple processors, whereby each processor encodes its part independently. This allows for data to be encrypted and decrypted at extremely fast rates. The ability to encrypt/decrypt data at high speeds is important for a variety of real-time applications, such as voice communications and video teleconferencing. Furthermore, fast encryption/decryption is highly desirable for network applications, such as asynchronous transfer mode (ATM).

Unfortunately, the parallel processing technique is relatively expensive due to the large area of silicon that is consumed by duplicate logic. The large die size directly translates into higher costs because less dies (i.e., chips) can be fabricated from a given wafer. Furthermore, the CBC, OFB, and CFB modes cannot take advantage of parallel processing because of the interdependencies between sequential blocks of data. In other words, one block of data is encrypted/decrypted according to a previously encrypted/decrypted block of data. Hence, prior art designs were typically tailored to a single mode of operation. As a result, a DES chip could only handle one mode of operation. Otherwise, accommodating multiple modes of operation would involve sacrificing its speed. Another drawback with prior art DES designs is the fact that physical constraints imposed by the process technology limit the silicon to a maximum bandwidth. However, it is mandatory for some applications (e.g., ATM) to operate at a much higher bandwidth than can be provided by the DES chip.

Thus, there is a need for a high-speed DES encryption and decryption mechanism that is capable of handling a variety of modes of operation. The present invention offers such a solution. The present invention pertains to a novel hardware architecture for the implementation of a DES system which can be used in conjunction with all possible DES modes (ECB, CBC, OFB, and CFB) and which has a high throughput. Furthermore, the performance of the DES design of the present invention is scalable to the clock frequency of the data being encoded. These and other advantages of the present invention will become apparent within discussions of the present invention herein.

DISCLOSURE OF THE INVENTION

The present invention pertains to a method for encrypting and decrypting digital data. The digital data is initially latched by an input register. Sixteen separate cipher stages cascaded in series are used to encrypt the digital data. These cipher stages are operating at a maximum frequency limited only by the process technology. The encoded digital data from the last cipher stage is stored in an output register. The input and output registers are capable of being docked at an interface frequency that is different from that of the core's data frequency. The clock is divided down from the interface frequency to meet the delay requirements of the sixteen cipher stages. After an appropriate number of cycles have elapsed, the output register is sampled. A programmable counter is used to indicate when the output register contains valid encrypted data. Thereby, the overall performance of the encryption block can be scaled to the clock frequency of the data that is passed through the DES core by controlling the clock through the input and output registers. This renders the path from the input register to the output register a multi-cycle path dependent on the input frequency and the speed of the process technology. The present invention can also be used to decrypt encoded messages. Furthermore, the present invention can be used in ECB, CBC, OFB, and CFB modes of operation.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

The present invention provides a novel hardware design and implementation for a standard encryption scheme, the Data Encryption Standard. This invention will provide encryption for secure private communication at high speeds with a throughput of at least 355 Megabits per second. The success of the present invention will allow faster DES hardware to be used in a wide range of applications at an acceptable cost. Following standard terminology, when addressing the encryption process, the original message shall be referred to as plain text, and the encrypted message shall be referred to as the cipher text. An unauthorized user attempting to decrypt cipher text shall be referred to as an adversary.

Figure 1:
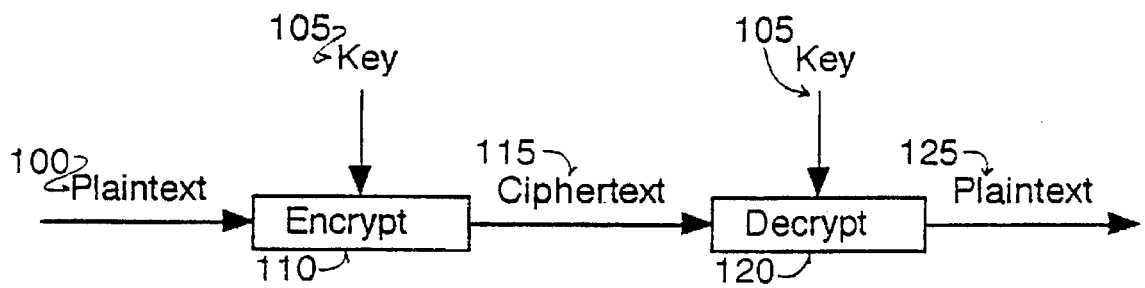
FIG. 1 represents a standard model for a key-based encoding device using a single key.

FIG. 1 represents a standard model for a key-based encoding device using a single key. The message, or plain text 100, undergoes encryption based on a key 105 and an encryption method 110. The key is chosen by the user and must be kept secret. The security of the encoding depends upon the secrecy of the key. The resulting output from the encoding is referred to as the cipher text 115. With knowledge of the key 105 and the proper decryption algorithm 120, the cipher text can be transformed back into the original plain text 125. This paradigm can be applied universally in a wide range of settings using a variety of underlying hardware or software schemes.

Figure 2:
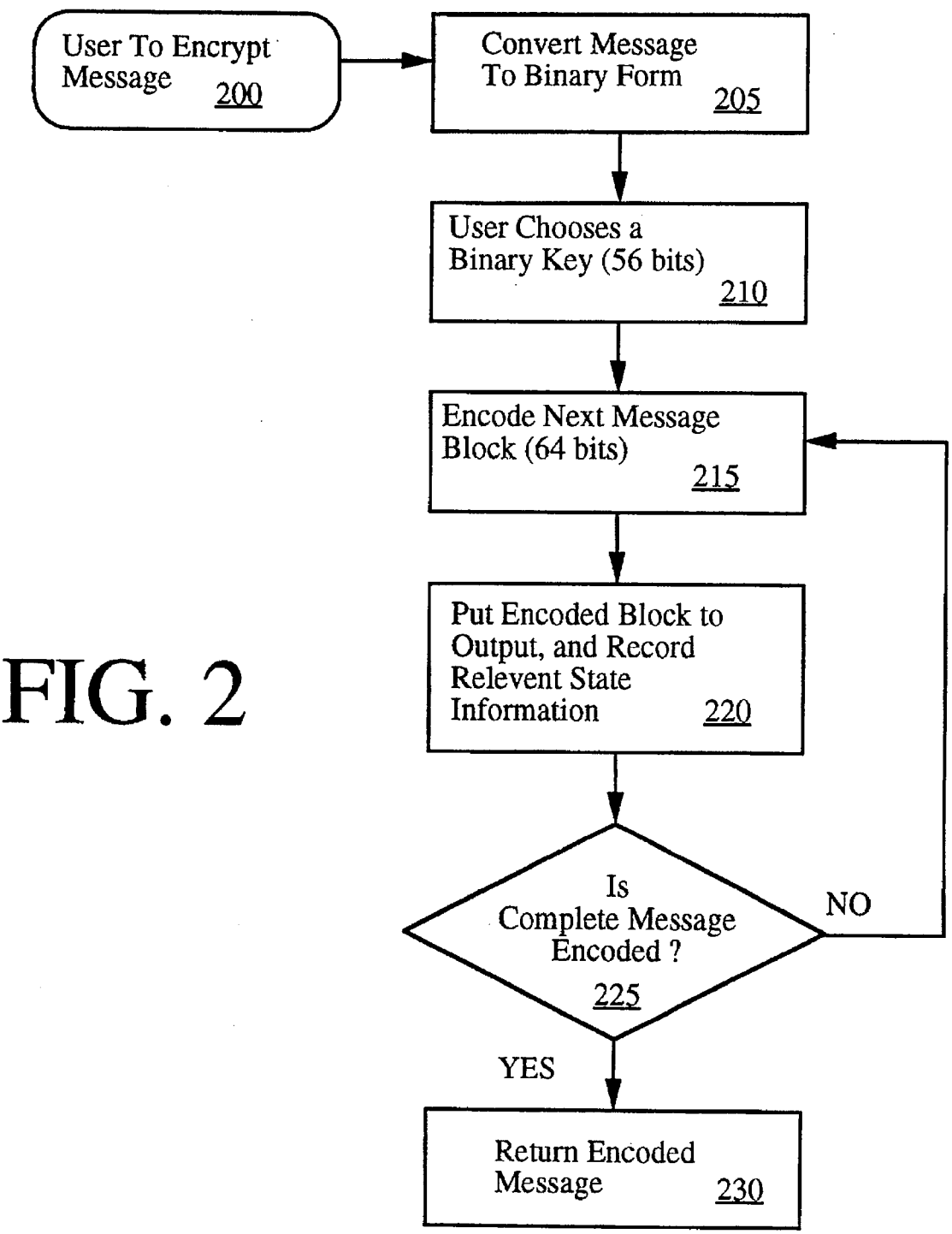
FIG. 2 is a flowchart describing the steps of how a message is transformed into the corresponding cipher text.

The Digital Encryption Standard, or DES, is an example of a key-based encryption scheme using a single key. FIG. 2 is a flowchart describing the steps of how a message in step 200 is transformed into the corresponding cipher text. The message is taken to be in binary form, step 205. The user is assumed to have chosen a 56 bit secret key, step 210. The message is encoded in 64 bit blocks, step 215. An encoded 64 bit block produces at 64 bit output block, step 220. Since only 64 bit blocks are acceptable, if the last block is not 64 bits in length, it is generally padded with some regular pattern (a sequence of O's, for example). The 64 bit blocks are encoded until the entire initial message is encoded, step 225. Next, the output blocks are concatenated to form the final encoded message, step 230. It should be noted that an encoding can also produce some state information which can be used in the encoding of subsequent blocks, step 220. This step is described in detail in the documentation specifying the DES standard. For example, in electronic codebook (ECB) mode, no such state information is used; each block is encoded independently. In cipher block chaining (CBC) mode, the plain text is XORed with the previous cipher text block before it is encrypted. The decryption method is entirely similar and is accomplished using the same key that is used for the encryption.

Figure 3:
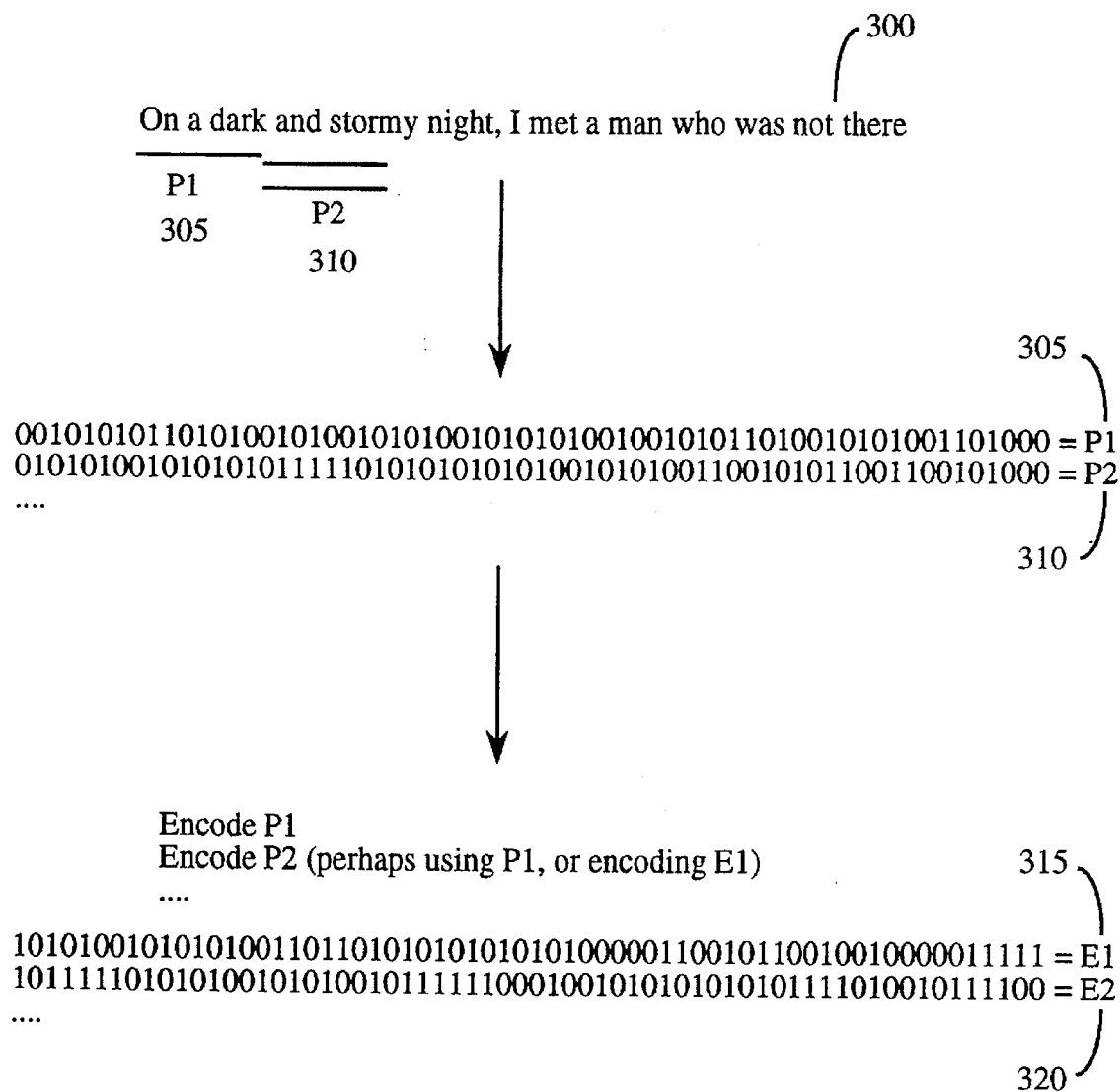
FIG. 3 illustrates a detailed example of the functionality of the DES encryption process.

FIG. 3 illustrates a detailed example of the functionality of the DES encryption process. The user has a plain text message 300 to be encoded. The plain text message is divided into 64 bit blocks P1, P2, etc., as indicated by 305 and 310. The 64 bit blocks are encoded sequentially into apparently random 64 bit strings E1, E2, etc., as shown by reference numerals 315 and 320. Finally, the encoded output consists of the concatenation of the strings E1, E2, and so on.

Figure 4:
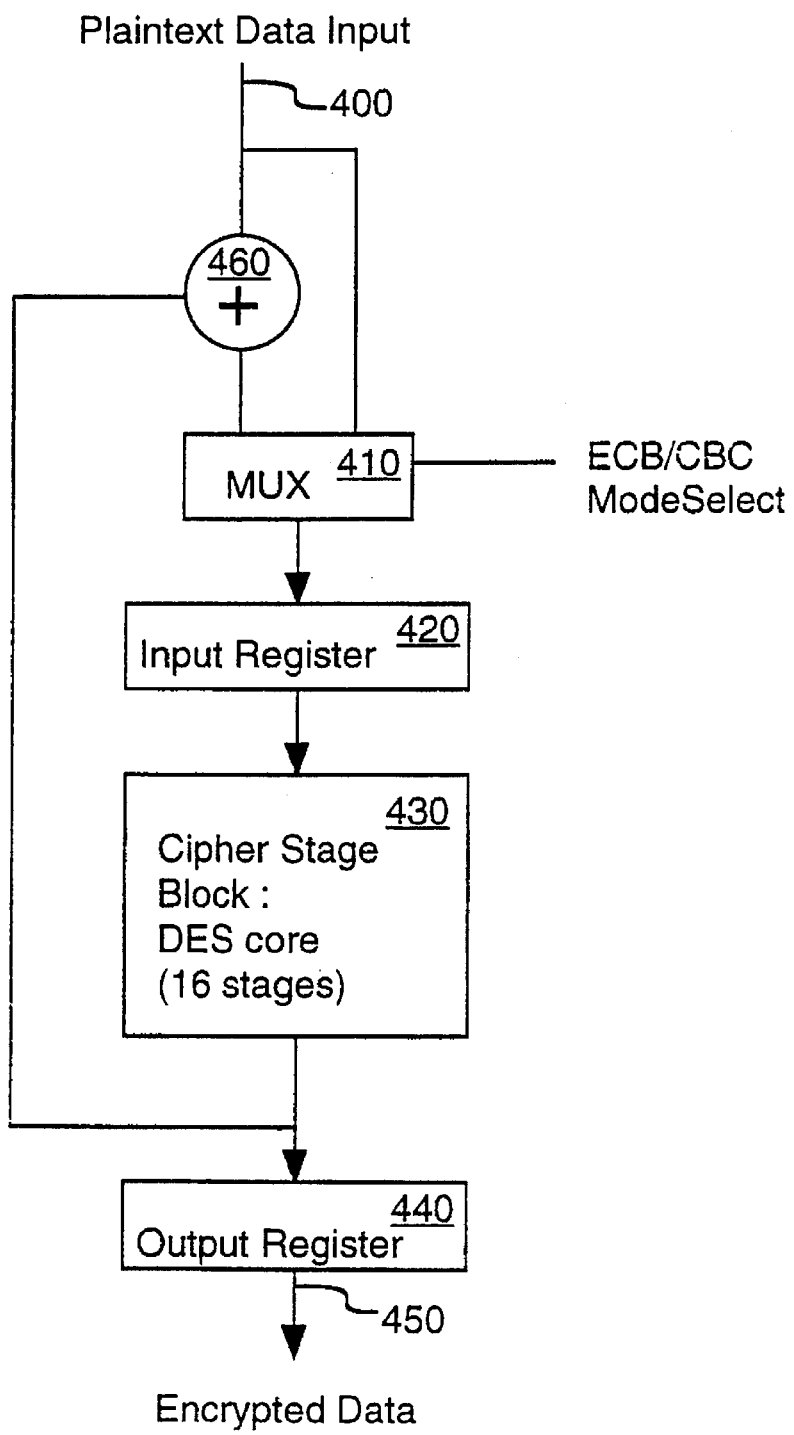
FIG. 4 is a block diagram showing the important features of a standard hardware implementation of the DES encryption scheme in CBC mode.

The currently preferred embodiment of the encryption architecture for the present invention is shown in FIG. 4. The design calls for a single DES block (or core) consisting of sixteen cipher stages 430. The plain text input to the DES hardware consists of a 64 bit block 400. There are sixteen rounds of identical operations. Each of these sixteen identical rounds shall be referred to as a cipher stage. The result from one cipher stage is used as the input to the next cipher stage for the second to the sixteenth stage. The determination of whether the input to the cipher stage should come from the plain text or the last cipher stage output is determined by a multiplexer 410 that passes the result to the appropriate input register 420. After sixteen cipher stages 430, the resulting encrypted data is stored in the output cipher text register 440. In the CBC mode, the output cipher text is fedback via feedback path 470, with the next 64 bit block 435 using an exclusive or (XOR) operation 460. Other modes of operation and decryption use the same principle architecture. For example, in the ECB mode, the XOR operation 410 is simply bypassed altogether. In standard implementations a cycle refers to a unit of time in which the underlying machine can perform one operation. The actual clock time for a cycle varies from machine to machine. The cipher operation is repeated sixteen times using the same hardware 430. For each cycle, the input to the cipher stage is determined by the output from the previous cipher stage. The time for the DES core to encrypt a single block may be several cycles worth of time on the underlying machine. By synchronizing the underlying machine and the DES block appropriately, however, one can ensure peak or near-peak performance, regardless of the cycle time. Thereby, the DES block effectively acts as a multi-cycle path that depends on the speed of the process technology and not on the cycle time.

Figure 5:
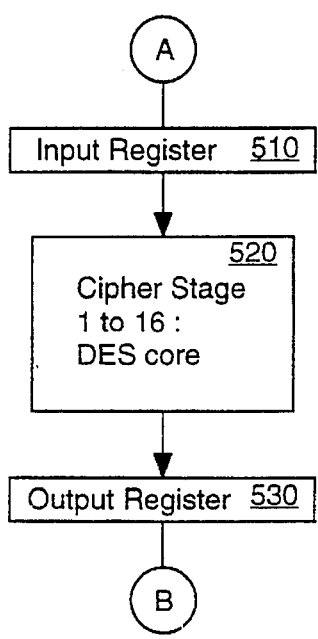
FIG. 5 shows a DES core.
Figure 5:
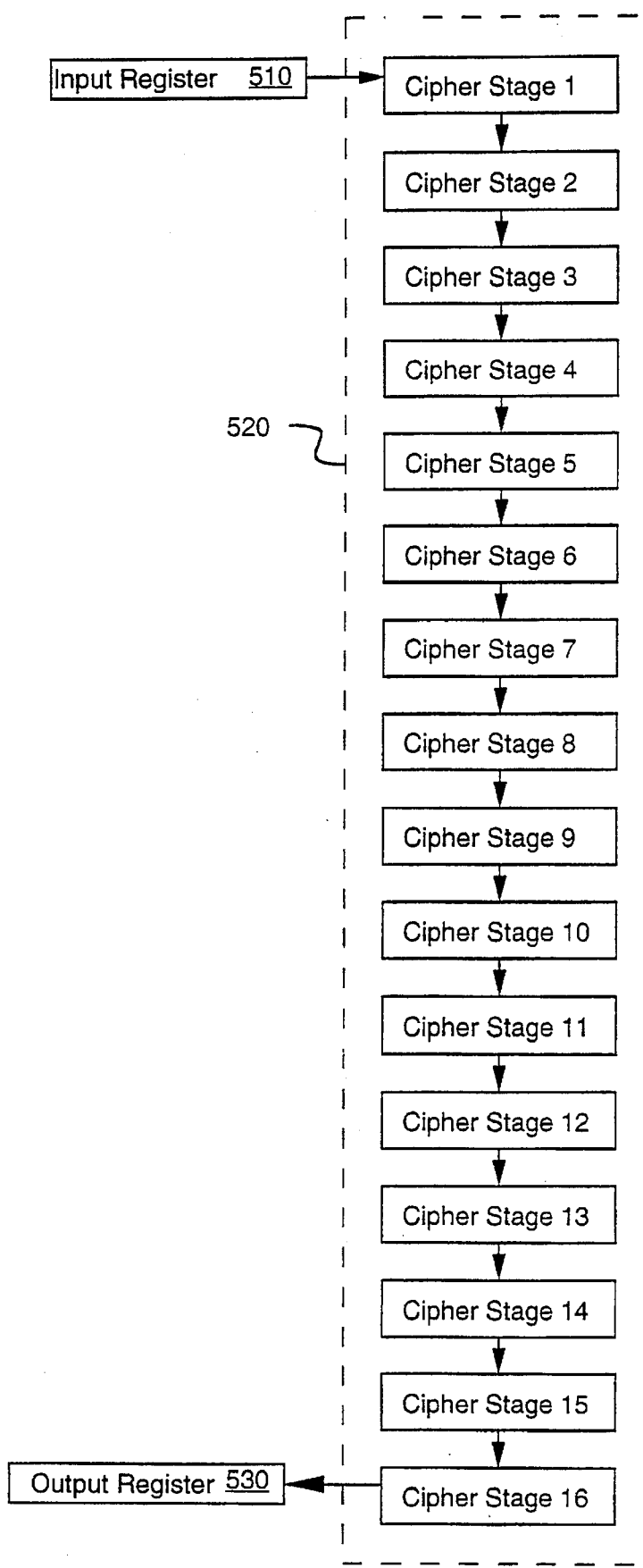

This DES core is shown in more detail in FIG. 5. The process from point "A" to point "B" as depicted by 500 involves latching the plain text data in input register 510, encrypting the data through sixteen cipher stages 520, and storing the encrypted data in output register 530. The sixteen stages 520 are cascaded together in series to dynamically flow the input data through each of the cipher stages. The input data is latched at the beginning of the sixteen cipher stages, after which it is cascaded through all sixteen of the cipher stages to the output register 530. It should be noted that the time for the DES block to complete the encryption task, or equivalently the time between the arrival of the input at the input register and the arrival of the output to the output register, is fixed by the hardware and is independent of the cycle time.

An example is now offered. If the process technology requires five nanoseconds for the data to pass through a single cipher stage, then the overall time for data to pass through the entire core is eighty nanoseconds. There will also be overhead from delay caused by the input register, the output register, multiplexing the data, etc. Assuming all the other delays total a further 10 nanoseconds, then the maximum throughput will be 90 nanoseconds for every 64 bits, or approximately 711 megabits per second. This would be the throughput if the clock speed is exactly 11.11 megahertz (90 nanoseconds/cycle). In most cases, the underlying machine may have a cycle time that is substantially smaller than 90 nanoseconds per cycle. In which case, the clock and the DES block must be synchronized as closely as possible to achieve peak performance. For example, suppose the underlying clock speed is 20 nanoseconds per cycle (50 megahertz). Hence, the data is placed into the input register and taken from the output register every 4.5 cycles in order to achieve the peak performance of 711 megabits per second. In most machines, data can be latched on the cycle or the half cycle, and hence, by scaling the frequency with which the input and output are latched appropriately, near-peak and often peak performance can be guaranteed by such a system. It should be noted that as the speed of the silicon technology improves, the time required by the DES core will improve as well. The above invention description is independent of the actual time taken by the DES core, and hence the description of the current preferred implementation in no way limits future improvements to performance derived from improvements in silicon technology.

Figure 6:
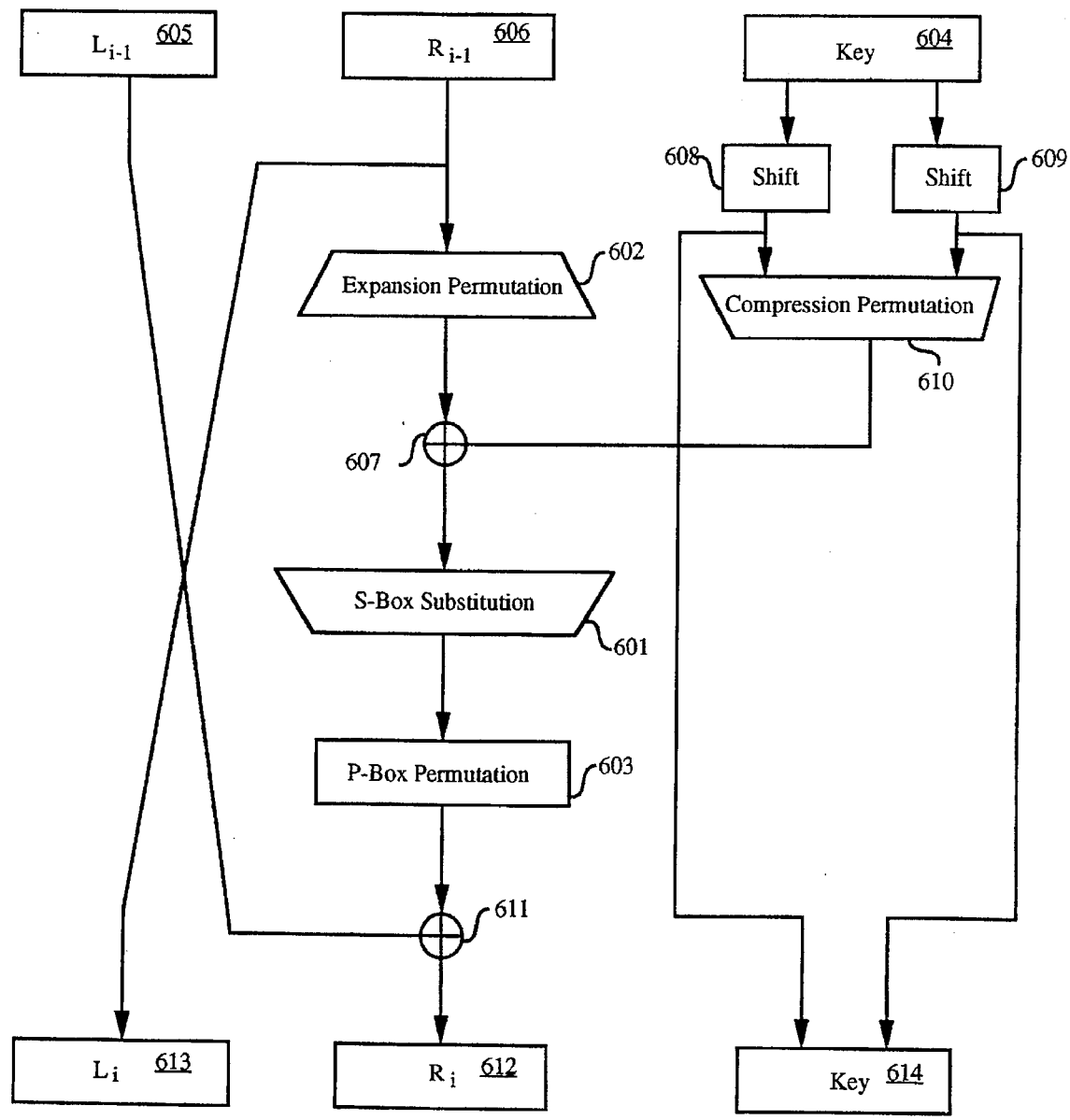
FIG. 6 shows a circuit diagram of an exemplary cipher stage.

FIG. 6 shows a circuit diagram of an exemplary cipher stage. At its most basic level, the DES algorithm is comprised of a combination of two fundamental techniques of encryption: confusion and diffusion. Accordingly, a cipher stage utilizes this principle by performing a substitution 601 in conjunction with permutations 602 and 603 on the plain text, based on the key 604. Initially, the 64-bit block of plain text is initially divided into a 32-bit left half (L) and a 32-bit right half (R). The letter "i" is used to designate the current iteration. Hence, the Li-1 block 605 represents the 32-bit left-half result of a previous iteration. Likewise, the Ri-1 block 606 represents the corresponding 32-bit right-half result of that previous iteration. The Ri-1 data is input to the expansion permutation block 602. The expansion permutation expands the right-half of the data from 32 bits to 48 bits. Essentially, this operation changes the order of the bits as well as repeats certain bits. The goal is to make the right-half the same size as the key for the XOR operation 607. Furthermore, it provides a longer result that can be compressed during the substitution process 601. Crytographically, the expansion permutation 602 allows one bit to affect two substitutions. Consequently, the dependency of the output bits on the input bits spreads faster. DES is designed to reach the condition of having every bit of the cipher text depend on every bit of the plain text and every bit of the key as quickly as possible.

At the same time, the 64-bit key 604 is transformed. It is reduced to a 56-bit key by ignoring every eighth bit. These bits can be used as a parity check to ensure that the key is error-free. After the 56-bit key is extracted, a different 48-bit subkey is generated for each of the 16 cipher stages as follows. First, the 56-bit key is divided into two 28-bit halves. Next, shifters 608 and 609 circularly shift the halves to the left by either one or two bits, depending on the particular cipher stage. Thereupon, a compression permutation 610 is used to permutate the order of the bits as well as select a 48-bit subset of bits. Because of the shifting, a different subset of key bits is used in each subkey. Moreover, each bit is used in approximately 14 of the 16 subkeys, although not all bits are used in exactly the same number of times. The resulting compressed key is then input to the XOR gate 607.

After the compressed key is XORed 607 with the expanded block, the 48-bit result is input to an S-box substitution 601. The substitutions are performed by eight different substitution boxes. Each S-box has a 6-bit input and a 4-bit output. The 48 bits are divided into eight 6-bit sub-blocks. Each separate block is operated on by a separate S-box. Each S-box is comprised of a table of 4 rows and 16 columns. Each entry in the box corresponds to a 4-bit number. The 6 input bits of the S-box specify under which row and column number to look for the output. The non-linearity of the S-boxes renders DES secure. Next, the 32-bit output from S-box substitution 601 is permutated by the P-box permutation 603. This permutation maps each input bit to an output position. No bits are used twice, and no bits are ignored. In other words, a straight permutation is performed.

The result from the P-box permutation 603 is XORed 611 with Li-1 605 to generate the right-half data Ri 612 for the current iteration. The left-half data Li 613 for the current iteration is taken directly from the right-half Ri-1 606 of the previous iteration. Lastly, the shifted key 614 is used in the following iteration.

Figure 7:
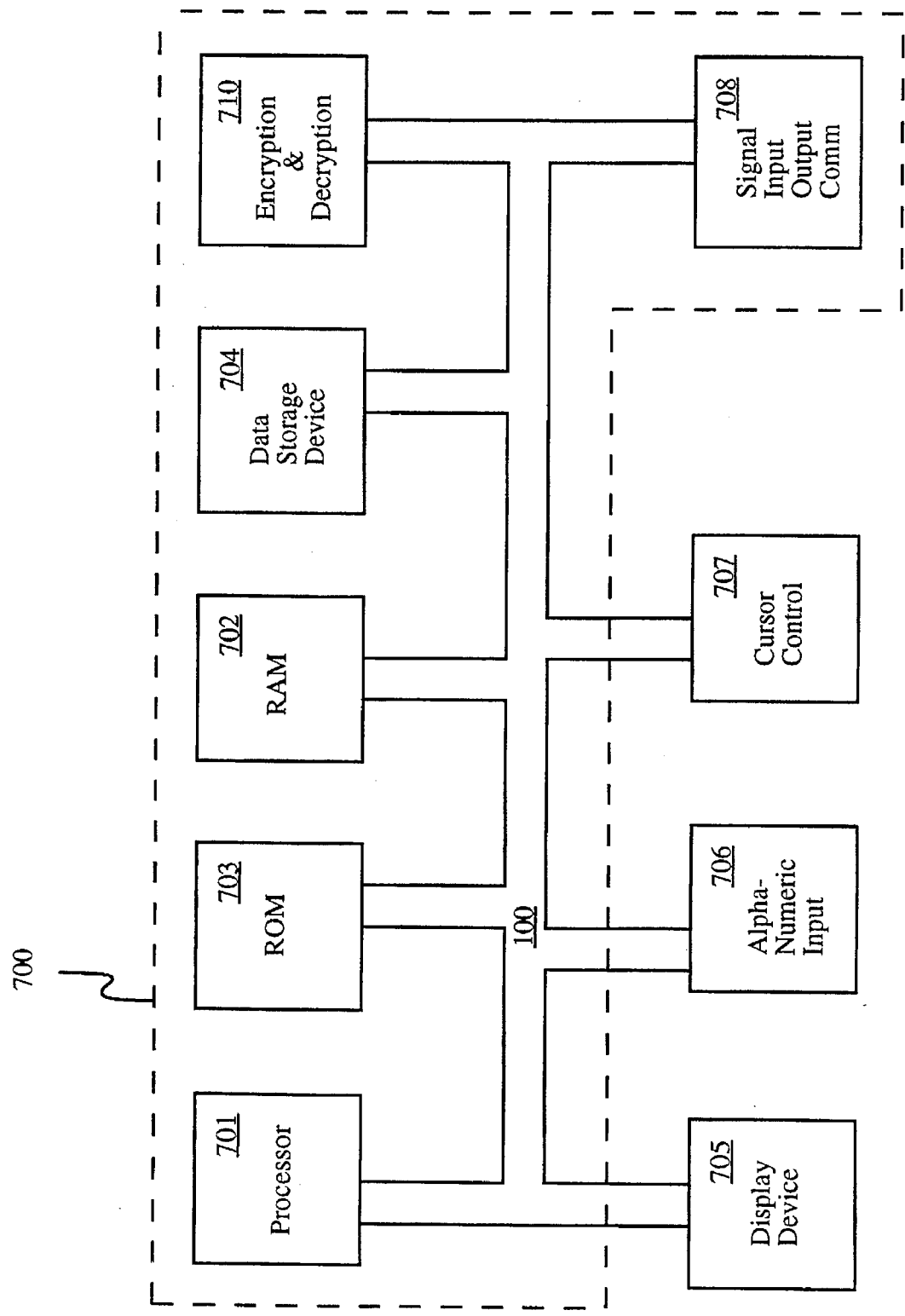
FIG. 7 illustrates an exemplary computer system upon which the present invention may be implemented or practiced.

FIG. 7 illustrates an exemplary computer system 700 upon which the present invention may be implemented or practiced. It is appreciated that the computer system 700 of FIG. 7 is exemplary only and that the present invention can operate within a number of different computer systems including general purpose computers systems, embedded computer systems, and computer systems specially adapted for secure transmissions. Computer system 700 of FIG. 7 includes an address/data bus 709 for conveying digital information between the various components, a central processor unit (CPU) 701 for processing the digital information and instructions, a random access memory (RAM) 702 for storing the digital information and instructions, a read only memory (ROM) 703 for storing information and instructions of a more permanent nature. In addition, computer system 700 may also include a data storage device 704 (e.g., a magnetic, optical, floppy, or tape drive) for storing vast amounts of data, and an I/O interface 708 for interfacing with peripheral devices (e.g., computer network, modem, etc.). Furthermore, an encryption and decryption circuit 710 may be used to encode outbound messages and decode received messages that were encrypted by the sender. Devices which may be coupled to computer system 700 include a display device 705 for displaying information (e.g., channel grid map, vertical constraint graphs, weighting functions, feasible links, etc.) to a computer user, an alphanumeric input device 706 (e.g., a keyboard), and a cursor control device 707 (e.g., mouse, trackball, light pen, etc.) for inputting data and selections.

The preferred embodiment of the present invention, is thus described. While the present invention has been described in particular embodiments, it should be appreciated that the present invention should not be construed as limited by such embodiments, but rather construed according to the below claims.

What is claimed is:

1. A method for encoding digital data, comprising the steps of:

storing the digital data in an input register;

processing the digital data through a plurality of cipher stages, wherein the cipher stages are cascaded in series and the processing is performed at a first frequency that is limited by the process technology;

storing encoded digital data from a last cipher stage in an output register;

clocking the input register and the output register at a second frequency;

determining a number of cycles for completing the processing step, wherein the number of cycles is a function of the first frequency and the second frequency;

sampling the output register when the number of cycles has completed.

2. The method of claim 1 further comprising the step of incrementing a programmable clock for counting the number of cycles, wherein the programmable clock indicates when the output register is to be sampled.

3. The method of claim 1 further comprising a decoding step which is comprised of the steps of:

inputting the encoded data into a second input register;

processing the encoded data through a second set of cipher stages to produce unencoded digital data;

storing the unencoded digital data in a second output register;

reading the unencoded digital data from the output register.

4. The method of claim 1 further comprising the step of controlling the second frequency to scale the processing step according to the first frequency.

5. The method of claim 1 further comprising the steps of:

feeding back the encoded digital data from the last cipher stage to an XOR gate;

performing an XOR function on the encoded digital data with a subsequent unencoded digital data.

6. The method of claim 5 further comprising the step of selecting between at least two modes of operation, wherein either an output from the XOR gate or the unencoded digital data is stored into the input register.

7. The method of claim 6, wherein the cipher stages are comprised of sixteen independent blocks conforming to a data encryption standard.

8. The method of claim 6, wherein the two modes of operation include cipher block chaining and electronic codebook modes.

9. The method of claim 6, wherein the digital data represents plain text.

10. An apparatus for encoding digital data, comprising:

an input register for storing digital data;

a plurality of cipher stages coupled to the input register for encoding the digital data, wherein the cipher stages are cascaded in series and the encoding is performed at a first frequency;

an output register coupled to a last cipher stage for storing encoded digital data;

a clock coupled to the input register and the output register for clocking the input register and the output register at a second frequency;

logic coupled to the output register for sampling the output register after a number of cycles have elapsed, wherein the number of cycles is a function of the first frequency and the second frequency.

11. The apparatus of claim 9 further comprising a programmable clock coupled to the output register for counting the number of cycles, wherein the programmable clock indicates when the output register is to be sampled.

12. The apparatus of claim 9 further comprising a decoder, wherein the decoder is comprised of:

a second input register in which encoded data is stored;

a second set of cipher stages coupled to the second input register for decrypting the encoded data;

a second output register coupled to the second set of cipher stages for storing decrypted digital data.

13. The apparatus of claim 9 further comprising a controller for controlling the second frequency to scale the processing step according to the first frequency.

14. The apparatus of claim 9 further comprising:

an XOR gate coupled to the input register that performs an XOR function on the encoded digital data with a subsequent unencoded digital data;

a feedback path feeding back the encoded digital data from the last cipher stage to the XOR gate.

15. The apparatus of claim 14 further comprising a selector coupled to the XOR gate which selects between at least two modes of operation, wherein either an output from the XOR gate or the unencoded digital data is stored into the input register.

16. The apparatus of claim 14, wherein the cipher stages are comprised of sixteen independent blocks conforming to a data encryption standard.

17. The apparatus of claim 14, wherein the two modes of operation include cipher block chaining and electronic codebook modes.

18. The apparatus of claim 14, wherein the digital data represents plain text.

* * * * *